United States Patent Office 3,186,105
Patented June 1, 1965

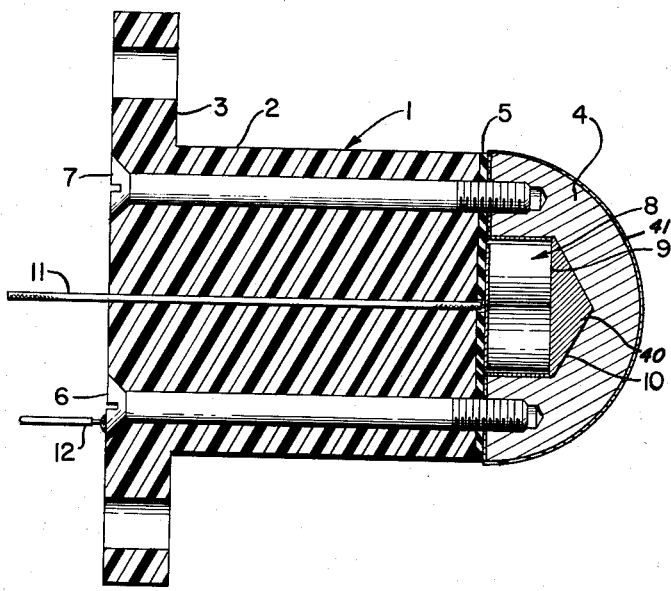
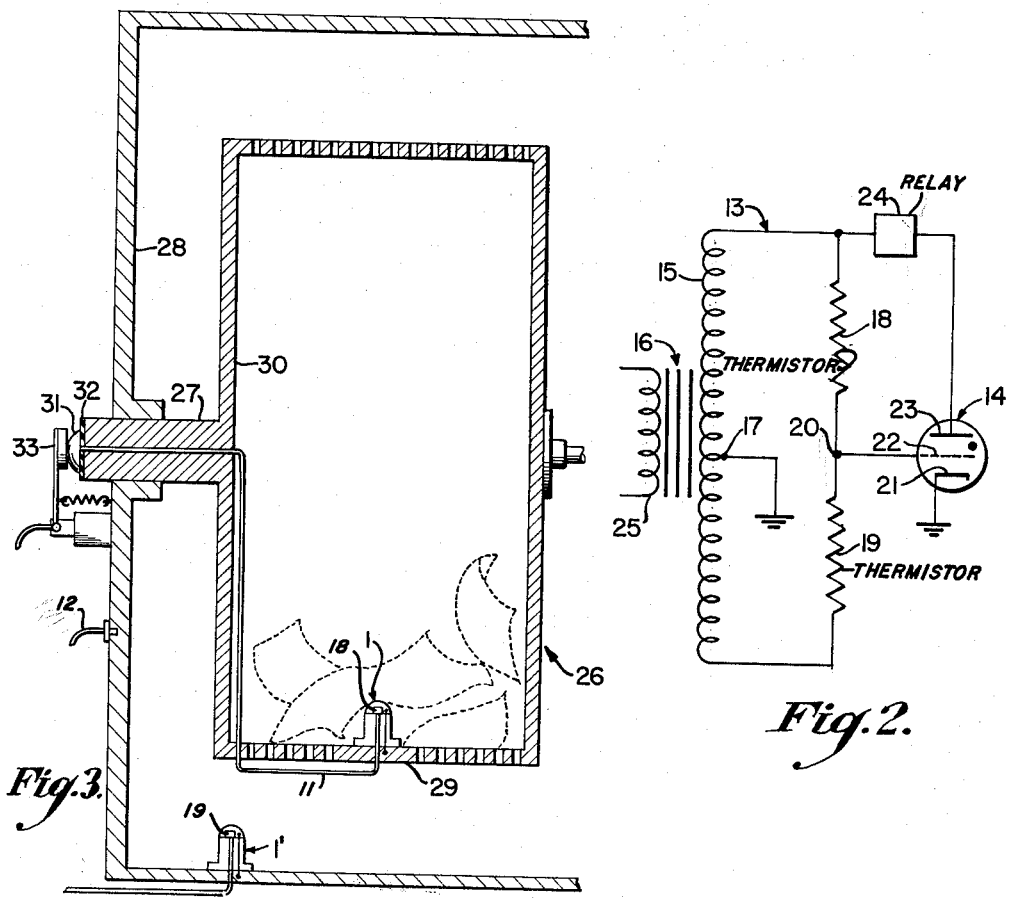

3,186,105
AUTOMATICALLY OPERATED CLOTHES DRIER
Dudley D. Nye, Jr., Fort Lauderdale, Fla., Phillip M. Connaught, Waterford, N.J., and Jerome H. Milgram, Melrose Park, Pa., assignors to Robertshaw Controls Company, a corporation of Delaware
Filed Oct. 24, 1960, Ser. No. 64,320
6 Claims. (Cl. 34—45)

The invention presented herein relates to apparatus for providing an electrical signal for use in controlling the termination of clothes driers and more particularly to apparatus which utilizes the fact that the thermal conduction of the fabrics being dried is dependent upon the moisture contained in the fabrics.

A number of clothes drier termination control circuits utilize indirect sensing of the moisture content of the fabrics being dried. In general, this is accomplished by sensing the temperature of the air in the exhaust duct or by sensing the relative humidity in the exhaust duct. These and other approaches to the drier termination problem have many disadvantages. For example, indirect measurements are mainly sensitive to the surface moisture on the fabrics and are insensitive to the entrained or internal moisture. In addition, the systems using indirect measurement of the moisture content require a relatively fixed size load to provide reasonable accuracy.

It is an object of this invention to provide apparatus which is responsive to direct sensing of the moisture of the fabrics being dried to provide an electrical signal for use in controlling the termination of a clothes drier.

Another object of this invention is to employ a sensing probe of novel construction positioned within the drum of the clothes drier which is directly contacted by the fabric being dried.

A further object of this invention is to provide a sensing probe of novel construction employing a resistance thermometer which responds to the thermal conduction of the fabrics being dried.

An additional object of the invention is to provide a circuit for use in controlling the termination of a clothes drier which is compensated for changes in the temperature of the drying air.

With these and other objects in view, the invention may take the form of a self-heated resistance thermometer positioned within the rotating drum of a clothes drier in combination with a bridge circuit, the output of which is used to control the conduction of an electron discharge device. The resistance thermometer is mounted in a probe that is constructed to minimize heat loss from the resistance thermometer, except from direct contact with the fabrics being dried. The resistance of the resistance thermometer varies with the amount of heat conducted away by the fabrics. Since the amount of heat conducted away is a function of the moisture in the fabrics, the resistance of the resistance thermometer provides a measure of the moisture content of fabrics being sensed. A second resistance thermometer is located to sense the temperature of the drying air to provide continuous compensation for variations in the temperature of the drying air. With this arrangement, the electron discharge device is made conductive when the resistance thermometer of the fabric sensing probe reaches a predetermined value as determined by the moisture of the fabrics being dried. The current flow through the discharge device is applied to a switching device for terminating the drier operation.

Other objects and advantages will become apparent from the following specifications taken in conjunction with the accompanying drawings in which:

FIG. 1 is a sectional view of the moisture sensing probe constructed in accordance with this invention;

FIG. 2 is a schematic circuit for use with the sensing probe shown in FIG. 1 to provide termination control for a clothes drier; and FIG. 3 is a diagrammatic view of an arrangement for mounting and wiring the probe shown in FIG. 1 within the drum of a clothes drier.

Referring now to the drawings and more particularly to FIG. 1, the probe 1 comprises an elongated cylindrical pedestal 2 having an outwardly extending flange 3 at one end for mounting the probe within the drum of the clothes drier and a hemispherically-shaped metal tip 4 spaced from the other end of pedestal 2 by a spacer 5. The spacer 5 has a central opening and is made from an electrical insulating material having a low thermal conductivity, such as nylon. The pedestal 2, tip 4 and spacer 5 are secured together in any suitable manner, such as by bolts 6 and 7 extending the length of the pedestal into threaded engagement with tip 4. The pedestal 2 can be made of metal or of low thermal conductive material, such as nylon. When it is made of a low thermal conductive material, the thermal insulating spacer 5 is not needed.

A resistance thermometer 8 is positioned within tip 4. Semiconductor materials, such as the type used in making thermistors, are particularly useful as the variable resistance portion 9 of the resistance thermometer 8 since such materials are highly sensitive to temperature and vary linearly with temperature. The resistance portion 9 is cylindrical in shape and is positioned within a cavity 10 provided in tip 4 adjacent the pedestal 2. The cylindrical shape for the resistance portion 9 is convenient since cavity 10 is readily formed by a simple drilling operation. In order to electrically insulate the cylindrical peripheral surface of resistance portion 9 from the adjacent cylindrical bore wall surface, the surfaces are separated by a thin annular space as shown.

The sensitivity of the resistance portion 9 is dependent upon heat exchange between the tip portion 4 and resistance portion 9. A portion of the heat exchange is accomplished by conduction by securing the resistance portion 9 in place in the cavity 10 by a mass of solder 40 placed between tip 4 and the adjacent end surface of resistance portion 9. This also provides a portion of the electrical path for the resistance thermometer 8. Solder is used as a means for securing and electrically connecting the electrical lead 11 to the resistance portion 9 of resistance thermometer 8. An insulated electrical lead 11 is brought to the outside of pedestal 2 through a central bore provided in the pedestal 2.

The path for current flow is thus via electrical lead 11 through the resistance portion 9 and the solder at the upper end of the resistance portion 9 to tip 4 and then via the bolt 6 to an electrical lead 12 extending from probe 1 which is secured to the end of screw 6 in any suitable manner, such as soldering. The bolts 6 and 7 can be formed from a low thermal conductive material, such as nylon, to reduce heat loss from tip 4 via the bolts. In such a case, a second insulated lead is passed through a bore in pedestal 2 similar to that provided for lead 11 and electrically connected to tip 4.

During operation, resistance thermometer 8 is electrically heated to a temperature which is above that of the drying air. Thermal conduction will, therefore, be away from the resistance thermometer 8. Since it is desirable that all such thermal conduction be via the fabrics being dried to provide accurate sensing of the moisture content of the fabrics, it is essential that heat loss from outside of the resistance portion 9 to the surroundings, other than by direct contact with the fabrics, be held to a minimum. This is accomplished by plating the hemispherical surface of tip 4 and the surface of tip 4 adjacent the spacer 5 with a layer 41 of a highly reflective material, such as chrome. Heat loss via the pedestal 2 is reduced by the use of the thermal insulating spacer 5 between tip 4 and pedestal 2.

As mentioned earlier, the cylindrical peripheral surface of resistance portion 9 is spaced from the adjacent surface of the cavity 10 to electrically insulate the surfaces from each other. However, thermal conduction between resistance portion 9 and tip 4 is desirable to provide good sensitivity and is increased by coating the surface of cavity 10 adjacent the cylindrical peripheral surface of resistance portion 9 with heat absorption material.

FIG. 2 illustrates a clothes drier termination control circuit utilizing probes of the type shown in FIG. 1. The circuit comprises an inductance-resistance bridge 13 providing the output signal for controlling an electron discharge device 14. Two arms of the bridge 13 are formed by the secondary winding 15 of a transformer 16. The secondary winding 15 has a center tap 17 which provides one output terminal of the bridge. The other two arms of the bridge include resistance thermometers 18 and 19 connected in series across the secondary winding 15. The other output terminal 20 of the bridge lies between the resistance thermometers 18 and 19.

The electron discharge device 14 comprises a thyratron tube having a cathode 21, a control element 22 and a plate 23. Output terminal 17 is connected to ground as is the cathode 21 of tube 14. Control element 22 of the tube 14 is connected to output terminal 20. The heater circuit for cathode 21 is conventional with current supplied from a separate winding of transformer 16. The heater circuit is not shown. Plate 23 is electrically connected to the secondary winding 15 at the same end as resistance thermometer 18. A current responsive switching device 24 is included in the plate circuit for terminating the operation of the drier in response to conduction of thyratron tube 14. For example, the device 24 may be a relay controlling the connections of the power source to the drier in the case of an electrical drier or the flow of gas in the case of a gas operated drier. The essential function of device 24 is to utilize the electrical signal provided by the circuit described for terminating the drying action of the drier.

The magnitude and polarity of the voltage appearing at the output terminals 17, 20 is dependent on the values of the resistance thermometers 18 and 19. Assuming the resistances of the resistance thermometers 18 and 19 are equal, there will be no voltage appearing at the output terminals 17 and 20. Should the impedance of arm 18 become less than the impedance of arm 19, a voltage will appear across terminals 17 and 20 which is in phase with the voltage appearing at the plate 23. When the magnitude of the voltage so developed is sufficient to cause the tube 14 to conduct, the tube 14 will conduct during one-half of each cycle of the alternating current applied to the primary winding 25 of transformer 16.

Semiconductor materials used in thermistors have a negative coefficient of resistance. The resistance thermometer located within the drum of a clothes drier is therefore connected as arm 18 of bridge circuit 13, while the resistance thermometer used to sense the temperature of the drying air is connected to provide arm 19. The bridge circuit 13 is designed so that the current flow through resistance thermometers 18 and 19 is sufficient to cause the temperature of the resistance thermometers to be a preset number of degrees above drying temperature. Current flow through resistance thermometers 18 and 19 may be adjusted in any suitable manner, such as varying the voltage input to primary winding 25 or placing a variable resistor in series with each of the resistance thermometers 18 and 19. Each variable resistor is varied an equal amount to change the current flow without altering the balance point of the bridge. Thus, when wet fabrics are initially placed in the drier, the thermal conduction of the fabrics is high, causing the temperature of resistance thermometer 18 to drop and its resistance to increase. However, as the moisture in the fabrics being dried is reduced, the thermal conductivity of the fabrics is reduced causing less heat to be conducted away from the tip 4 of probe 1 which in turn causes the temperature and the resistance of arm 18 to increase and decrease, respectively. The resistance of arm 18 thus decreases with respect to arm 19 as the fabrics are dried until the magnitude of the control signal developed at the output terminals 17 and 20 is sufficient to cause tube 14 to conduct. An electrical current for operating device 24 to terminate the drier operation is thus made available when the moisture content of the fabrics decreases to a predetermined level. The degree to which fabrics are to be dried can be varied by connecting a variable bias voltage to the control element 22 of tube 14 to alter the operating point of tube 14.

Since the resistance thermometer 19 is used to sense the temperature of the drying air, the bridge circuit 13 is continually compensated for changes in resistance thermometer 18 due to changes in the temperature of the drying air. Without the compensating resistance thermometer 19, changes in the temperature of the drying air would appear to resistance thermometer 18 as changes in thermal conductivity of the fabrics being dried, which obviously is not desirable.

FIG. 3 shows a manner in which the probe of FIG. 1 is mounted in a cylindrical drier drum 26. The drum 26 is fitted with a shaft 27 which is positioned for rotation in the drier frame 28. In operation, the shaft 27 is horizontally positioned for rotation about its axis. Probe 1 is shown mounted within the drum 26 on the cylindrical wall 29 with the tip 4 directed toward the center of the drum.

The electrical lead 11 of probe 1 is brought through the cylindrical wall 29 of drum 26 at the point where the probe 1 is mounted and reenters the drum 26 adjacent the end wall 30. The electrical lead 11 is then passed through a hole extending axially of the shaft 27 and is connected to a metal contact button 31 spaced from the end of shaft 27, which extends through the drier frame 28, by an insulating washer 32. The exterior electrical connection for one side of the resistance thermometer mounted in probe 1 is completed by the use of a spring-loaded contact 33 which engages the contact button 31. The electrical lead 12 of probe 1 may be connected directly to the cylindrical wall 29 of drum 26, or, as shown in FIG. 3, to any portion of the drier frame since the drum and the frame are at the same potential.

The resistance thermometer 19 is provided by a probe 1 shown mounted within the drier frame 28 in the same heating space occupied by the drier drum 26 to provide the desired temperature compensation.

Though only one sensing probe is shown mounted in the drier drum 26, it is possible to use more than one probe to obtain better sensing of the fabrics being dried. When more than one probe is used, the probes are connected in parallel in the circuit shown in FIG. 2 so that the connections for a second probe mounted in drier drum 26 can be the same as shown in the single probe embodiment illustrated in FIG. 3.

It can be appreciated that probe 1 shown in FIG. 1 and mounted within the drier drum as shown in FIG. 3 provides excellent contact with fabrics being dried and does not interfere with the movement of the fabrics to hamper the drying action of the clothes drier.

The invention described herein is not limited to the details shown but may assume numerous forms and the scope of the invention is to be defined solely by the following claims.

We claim:

1. Apparatus for providing an electrical signal dependent on the thermal conductivity of fabrics being dried in the rotating drum of a clothes drier by heated air passing through the drum, said apparatus comprising a first resistance thermometer including a metal sensing member carried by and thermally insulated from said drum and a resistance portion mounted within said sensing member, said sensing member coming in contact with fabrics placed in said drum for drying whereby the resistance of said resistance portion varies with the thermal conductivity of the fabrics; a second resistance thermometer positioned in said clothes drier for sensing the temperature of the air used to dry said fabrics; an electrical circuit including said first resistance thermometer having an electrical output determined by the resistance of said first resistance thermometer; and means connecting said second resistance thermometer in said electrical circuit to compensate for the changes in the resistance of said first resistance thermometer due to variations in the temperature of the drying air.

2. Apparatus for providing an electrical signal dependent on the thermal conductivity of the fabrics being dried in the rotating drum of a clothes drier, said apparatus comprising a metal sensing member having an end portion positioned within and thermally insulated from said drum which comes in contact with fabrics placed in said drum for drying; a resistance thermometer having a temperature sensitive resistance mounted in said member; a second resistance thermometer positioned in said clothes drier for sensing the temperature of the air used to dry said fabrics; a first electrical circuit including said first and second resistance thermometers, said first circuit supplying current to said resistance thermometers to heat them to a temperature above the temperature of the air used to dry said fabrics; and a second electrical circuit connected to respond to the output signal of said first circuit to provide an electrical signal when said output signal reaches a predetermined magnitude.

3. Means responsive to the thermal conductivity of fabrics being dried by heated air in the rotating drum of a clothes drier for operating an electrical control element of said drier comprising
a voltage source;
means including an electronic bistable switch connecting said source with said control element;
first temperature-responsive resistor means applying a biasing potential to said switch to control the state of conduction thereof, said first resistor means being positioned in the drum to sense the thermal conductivity of the fabrics therein;
second temperature-responsive resistor means disposed outside the drum to sense the temperature of the drying air;
and means connecting said second and first resistor means to compensate for the changes in the resistance of said first resistor means due to variations in the temperature of the drying air.

4. Apparatus as defined in claim 3 wherein said first resistor means includes a temperature responsive resistor heated to a temperature above its surroundings whereby thermal conduction is in a direction away from said resistor to provide accurate sensing of the moisture content of the fabrics.

5. Apparatus as defined in claim 3 wherein said electronic bistable switch comprises a thyratron.

6. Means responsive to the thermal conductivity of fabrics being dried by heated air in the rotating drum of a clothes drier for operating an electrical control element of said drier, comprising an alternating-current voltage source including a secondary winding having a grounded center tap:
a first temperature-responsive resistor positioned in the drum to sense the thermal conductivity of the fabrics therein;
a second temperature-responsive resistor disposed outside the drum to sense the temperature of the drying air;
circuit means connecting said first and second resistors in series with said secondary winding, said resistors being heated by the current of said source to a temperature above the temperature of the air used to dry said fabrics;
a thyratron having plate, grid and grounded cathode electrodes;
first conductor means connecting said grid electrode with said circuit intermediate said first and second resistors;
and second conductor means connecting said control element intermediate said plate electrode and a point on said circuit intermediate said secondary winding and said first resistor.

References Cited by the Examiner
UNITED STATES PATENTS

| | | | |
|---|---|---|---|
| 2,436,762 | 2/48 | Turin | 317—127 |
| 2,579,271 | 12/51 | Polye | 338—28 |
| 2,590,041 | 3/52 | Roost | 338—28 |
| 2,643,464 | 6/53 | Hadady | 34—48 |
| 2,704,326 | 3/55 | Whitson | 317—142 |
| 2,743,530 | 5/56 | Smith | 34—45 |
| 2,753,714 | 7/56 | Perkins et al. | 338—23 X |
| 2,851,790 | 9/58 | Worst | 34—48 |
| 2,885,789 | 5/59 | Conkling et al. | 34—45 |
| 2,933,708 | 4/60 | Elliot et al. | 338—28 |
| 2,967,428 | 1/61 | Burgert | 73—362 X |
| 2,973,495 | 2/61 | Greenberg | 338—28 |
| 3,007,080 | 10/61 | Benson | 315—157 |
| 3,031,768 | 5/62 | Kurowski | 34—45 |
| 3,050,865 | 8/62 | Morey | 34—45 |
| 3,125,422 | 3/64 | Thunander | 34—45 |

NORMAN YUDKOFF, *Primary Examiner.*

NEIL C. READ, *Examiner.*